United States Patent [19]

Babb

[11] 3,744,919

[45] July 10, 1973

[54] COLOR MEASURING WITH MEMORY

[75] Inventor: Raymond E. Babb, Fremont, Calif.

[73] Assignees: Genevieve I., (formerly Genevieve I. Magnuson) Hanscom, Santa Cruz; Genevieve I. Magnuson, San Jose; Robert Magnuson, San Jose; Lois J. (formerly Lois J. Duggan) Thomson as Trustees of the Estate of Roy M. Magnuson Thomson, San Jose, Calif.; part interest to each

[22] Filed: July 16, 1971

[21] Appl. No.: 163,294

Related U.S. Application Data

[63] Continuation of Ser. No. 879,295, Nov. 24, 1969, abandoned.

[52] U.S. Cl.............. 356/189, 356/173, 356/186, 356/212
[51] Int. Cl.......................... G01j 3/48, G01n 21/48
[58] Field of Search.................. 356/212, 188, 186, 356/173, 195, 177, 95, 51, 83, 86, 189

[56] References Cited
UNITED STATES PATENTS

| | | | |
|---|---|---|---|
| 2,847,899 | 8/1958 | Walsh | 356/95 |
| 3,025,746 | 3/1962 | Cary et al. | 356/173 X |
| 3,089,382 | 5/1963 | Hecht et al. | 356/51 |
| 3,330,904 | 7/1967 | Gebel | 356/177 |
| 3,421,821 | 1/1969 | Alessi | 356/186 |
| 3,486,822 | 12/1969 | Harris | 356/83 |
| 2,686,452 | 8/1954 | Bentley | 356/195 |

Primary Examiner—Ronald L. Wibert
Assistant Examiner—V. P. McGraw
Attorney—Harper Allen and Ben J. Chromy

[57] ABSTRACT

A manually operable portable direct reading apparatus and method providing reflectance measurements in two spectral modes, for example red and green without the use of high speed rotating filters, light choppers and synchronizing devices. The signal corresponding to one of these modes is stored in a memory for comparison with the signal from the other mode. Ratios between these modes are automatically computed and displayed either as a mathematical ratio or as a numerical value.

7 Claims, 9 Drawing Figures

Patented July 10, 1973
3,744,919
5 Sheets-Sheet 1
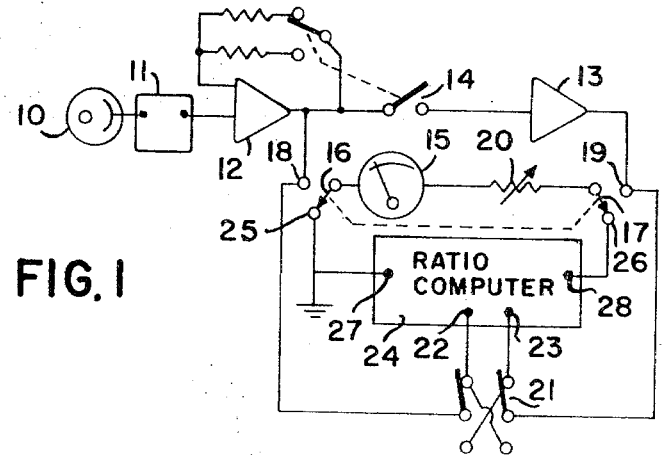
FIG. 1
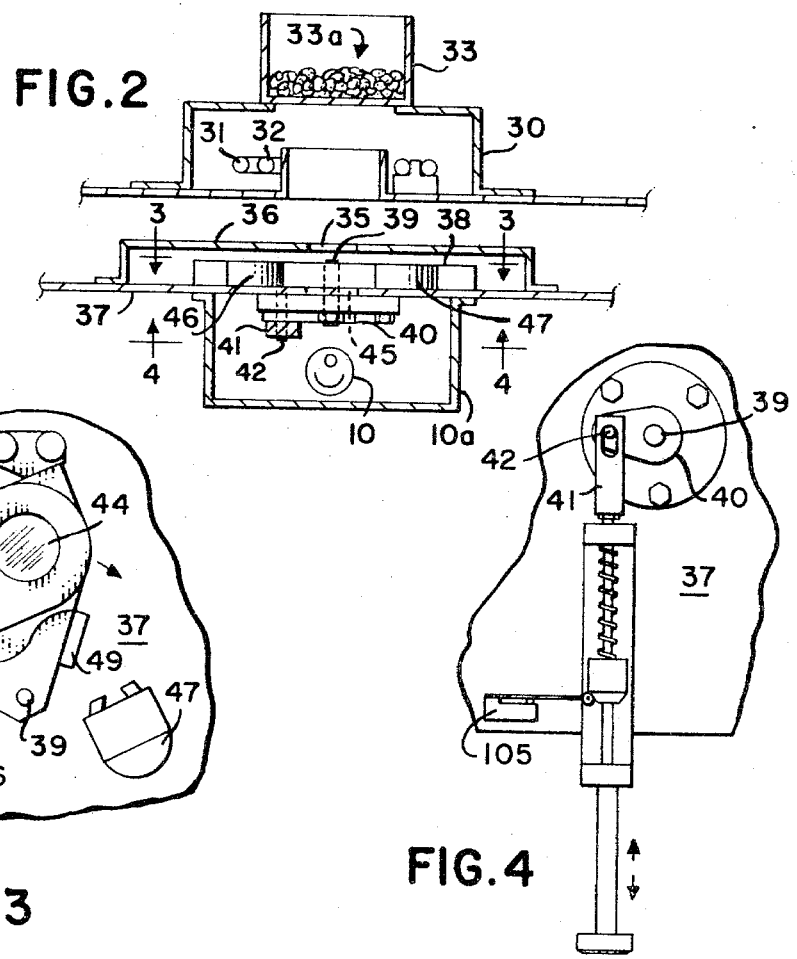
FIG. 2
FIG. 3
FIG. 4
INVENTOR.
RAYMOND E. BABB
BY
ATTORNEYS

INVENTOR.
RAYMOND E. BABB
BY
ATTORNEYS

INVENTOR.
RAYMOND E. BABB

Patented July 10, 1973

INVENTOR.
RAYMOND E. BABB

BY

ATTORNEYS

COLOR MEASURING WITH MEMORY

This application is a continuation of application Ser. No. 879,295 filed Nov. 24, 1969 assigned to a common assignee now abandoned.

DESCRIPTION OF THE INVENTION

This invention relates to an apparatus and method for making reflectance measurements of a product in separate parts of the light spectrum to determine a condition of the product.

Heretofore various photometric devices and methods such as disclosed in U.S. Pat. Nos. 3,025,746 and No. 3,089,382 have been proposed for analysing the color characteristics of various products by passing the light to be used in the analysis through rotating filters and/or chopper disc, both of which rotating devices being operated at relatively high speeds on the order of 3600 rpm. The light passing alternately through the two filters provides signals that are supplied in rapid succession to a switching device which is operated in synchronism with the rotation of the filters so that signals from the respective filters are supplied to separate integrating circuits connected to a ratio recorder. These devices are not practical for color grading product samples where the operation is to be manually performed on product samples selected at random. The present appratus was constructed for the purpose of making reflectance measurements of products by manually controlling the apparatus such that the reflectance signal due to one color, for example, green is generated and stored in a memory for future use. The memory is then isolated from the generating apparatus and the reflectance signal from the other colors for example, red is generated. While the red signal is being generated it is compared with the green signal stored in the memory to obtain a ratio therebetween. The present apparatus was constructed to be highly portable and economical to manufacture as well as reliable in operation without the use of high speed rotating filters and light choppers.

It is, therefore, an object of this invention to provide an improved readily portable apparatus and method which is manually controlled and which produces reliable reproduceable results and is economical in operation.

Another object of this invention is to provide an improved readily portable and manually operable apparatus and method for making direct reading reflectance measurements in two spectral modes, for example red and green without the use of high speed rotating filter wheels and light choppers for operating high speed switches.

Another object of this invention is to provide an apparatus and method for making reflectance measurements of a product in two spectral modes, storing the signal from one of these reflectance measurement modes in a memory and thereafter comparing the signal from the other of said reflectance measurement modes with the stored signal to obtain the true mathematical ratio therebetween or the difference between the signals obtained from the two color modes.

A further object of this invention is to provide a manually operable apparatus and method for making reflectance measurements of a product in two spectral modes which are widely separated in the light spectrum without the use of high speed rotating filters or light choppers, producing an electrical signal from one of said modes and supplying said signal to an integrating device temporarily connected to a memory in which said signal is stored for a period up to ten minutes or more, said integrating device being disconnected from the memory while another signal in the other of said modes is being produced and while said other signal is being compared with the stored signal to obtain the difference or ratio therebetween.

A further object of this invention is to provide a manually operable apparatus and method for making reflectance measurements of product samples one after another in two spectral modes without the use of high speed rotating light filters or choppers, said spectral modes being in widely separated parts of the spectrum, generating a voltage representing the reflectance measurement of a product in one of said modes, storing the voltage representing said reflectance measurement for a time interval required which may be ten minutes or longer, generating a voltage representative of the reflectance measurement of said product in the other of said modes, comparing the voltage stored in said memory with the voltage produced in said second mode, obtaining the difference between said voltages or the mathematical ratio therebetween, generating a voltage representing the reflectance measurement in said one mode from another product, automatically adjusting the level of the voltage stored in said memory if necessary so that it is representative of the reflectance measurement in said one mode from said other product, generating another voltage representing a reflectance measurement of said other product in said other mode, and comparing this last voltage with the adjusted stored voltage to obtain the ratio or difference between the voltages relating to said other product.

Still another object of this invention is to provide an improved manually operable apparatus and method for making reflectance measurements of a product to determine the condition thereof by measuring the green reflectance of the product, storing this value in a memory and comparing it to the value of the red reflectance from the product to obtain the difference between these values or the mathematical ratio therebetween.

Other and further objects of this invention will be apparent to those skilled in the art to which it relates from the following specification, claims and drawing.

In accordance with this invention there is provided an apparatus and method for making reflectance measurements of a product in two spectral modes for the purpose of determining a condition of the product. These measurements are made by placing the product in a sample well at the top of the instrument. The product is then illuminated by light from two gaseous discharge tubes, one of which is a neon tube and the other of which is a mercury vapor tube. The light reflected from the product is directed through suitable filters to a light sensitive cell or phototube. Normally the green filter is selected first and the signal passing through this filter to the phototube is amplified by an amplifier, rectified and integrated. The integrating device is temporarily connected to a memory in which the signal is stored for a period of ten minutes or more for future use. After the output signal of the amplifier, which corresponds to the "green" signal, is stored in the memory the green filter is replaced by a red filter and at the same time the integrating device is disconnected from the memory. The red reflectance is then converted to a signal by the phototube which receives the light reflected from the product through the red filter. Both the "red" signal from the main amplifier and the "green" signal from the memory are then supplied either to inputs of an analog divider which functions as a ratio computer or directly to a metering circuit. If the "red" and "green" signals are supplied to a ratio computer then the true mathematical ratio between these signals is obtained and if these signals are supplied directly to a metering circuit then a numerical value of the sum or difference thereof may be obtained.

Variances in transmission of the two color modes, that is the green and red modes due to differences in the light source intensities, filter transmission, etc., require the apparatus to be balanced so that equal signal amplitude is obtained in both the red and green modes. This is accomplished by adjusting the main amplifier gain in the red mode to equal the gain in the green mode or vice versa while making reflectance measurements from a neutral standard giving equal spectral reflectance at both of these modes. A variable resistor or potentiometer which is referred to as the balance control is connected to the main amplifier for this purpose.

In addition the meter calibration potentiometer which is connected in series with the meter, is adjusted when the neutral color disk is positioned in the product well of this device, so that the meter reads 100 or full scale. This potentiometer is referred to as the calibration control. Since the amplifier was adjusted to give equal signal amplitudes for both the red and green signals the meter now gives a reading of 100 on either one of these signals. When the ratio between the red and green signals is to be obtained the instrument is provided with a ratio selector switch which has two positions and one or the other of these positions is used depending upon whether the red signal is greater than the green signal or vice versa. If the dominant color in the product is red as in the case of ripe tomatoes the ratio selector switch is set so that the meter reading gives the green reflectance as a certain percentage of the red reflectance. On the other hand if green is the dominant color the ratio selector switch is set so that the meter reading indicates the red reflectance as a certain percentage of the green reflectance.

Further details and features of this invention will be set forth in the following specification, claims and drawing in which, briefly:

FIG. 1 is a simplified block diagram of this apparatus employed for the purpose of facilitating the explanation of the operation of this invention;

FIG. 2 is a vertical sectional view through the product well of this apparatus showing the general arrangement of the light sources, filter carriage and light sensitive cell;

FIG. 3 is a sectional view taken along the line 3—3 of FIG. 2;

FIG. 4 is a sectional view taken along the line 4—4 of FIG. 1;

Figure 5:
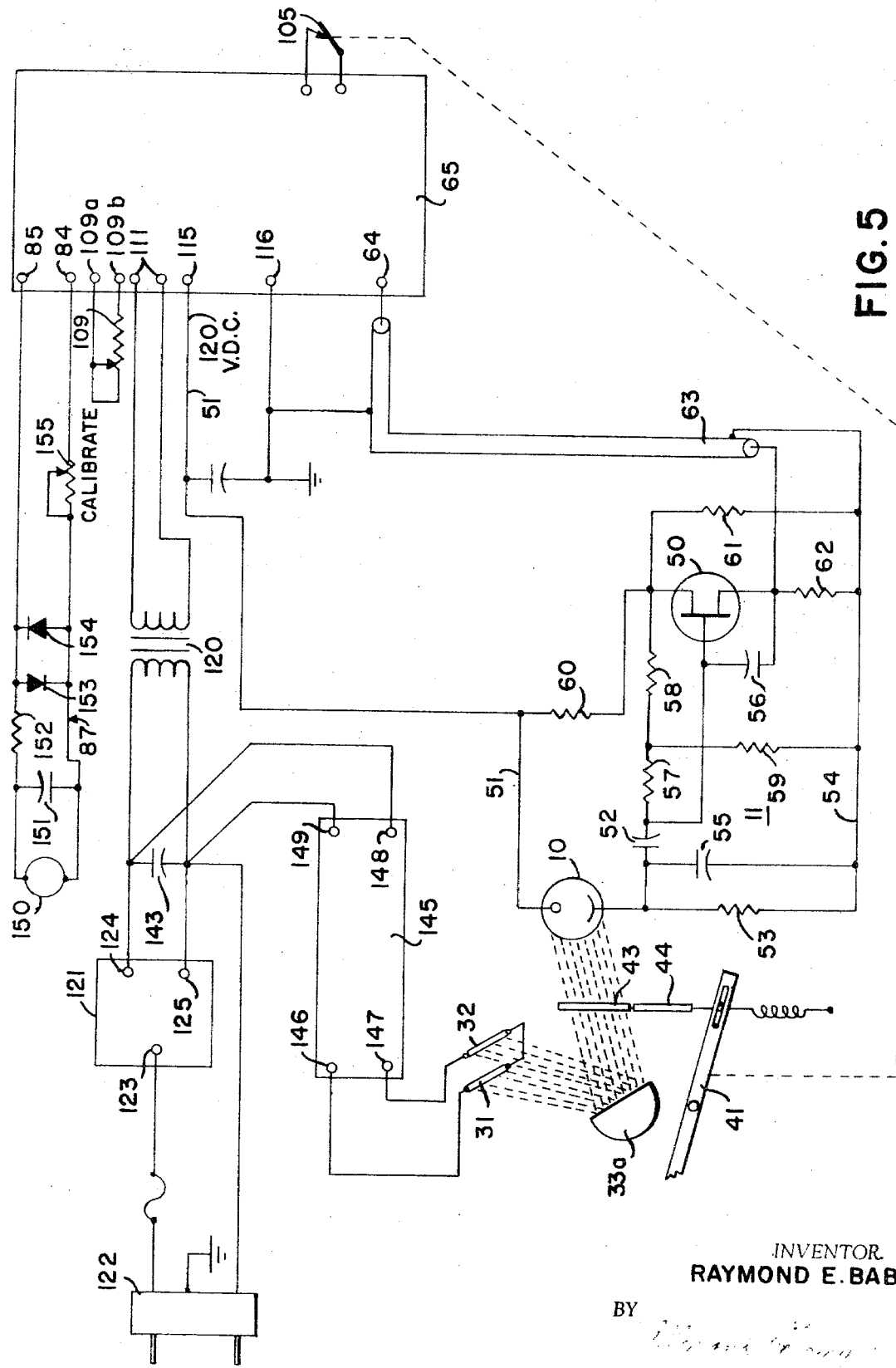
FIG. 5 is a schematic wiring diagram of the circuit arrangement employed in the apparatus for obtaining numerical values between the two reflectance mode signals.

Referring to the block diagram shown in FIG. 1 of the drawing, phototube 10 is connected to the phototube amplifier 11 and the output of this amplifier is connected to the input of the main amplifier 12. The output of amplifier 12 is connected to the memory 13 through the switch 14 which is closed when the green reflectance signal is supplied to the memory. The meter 15 is connected to the switches 16 and 17 and when switch 16 is positioned on contact 18 and switch 17 is positioned on contact 19 the meter 15 is connected between the output of amplifier 12 and the memory 13. Thus, the meter 15 may be used as a null indicator to balance the main amplifier 12 so that the red signal output is equal to the green signal output when the neutral reflectance disk or standard is positioned in the product well of the lamp housing of this apparatus.

A variable resistor 20 which is connected in series with the meter 15, is adjusted to provide the desired meter scale factor. Contacts 18 and 19 of switches 16 and 17, respectively, are also connected to the blades of reversing switch 21 which is a double pole, double throw type and which is referred to as the ratio selector. The Y terminal 22 and the Z terminal 23 of the ratio computer 24 are connected to the contacts of the reversing switch 21 so that the Y and Z terminals may be connected to the contacts 18 and 19 interchangeably. Reversing switch 21 is used in making ratio measurements. If the green signal is less than the red signal then the switch 21 is in its upper position and if the red signal is less then the green signal then the switch 21 will be placed in its lower position. When the ratio between the red and green signals is to be determined, switches 16 and 17 are placed on the lower contacts 25 and 26, respectively, so that the meter 15 is connected across the output terminals 27 and 28 of the ratio computer 24.

Referring to FIGS. 2, 3 and 4 of the drawing in detail reference numeral 30 designates a lamp housing which is of generally circular configuration and in which two gaseous discharge tubes 31 and 32 which comprise the light sources of this apparatus, are positioned. One of these light sources is provided with an atmosphere of neon gas and the other is provided with a small quantity of mercury so that the mercury vapor forms the atmosphere therein. Thus, one of these light sources provides the red illumination and the other provides the green illumination for the sample which is positioned in the transparent cup 33. This cup is adapted to be supported by the lamp housing 30 over an aperture or well provided in the top thereof so that the sample of the product 33a in this cup is illuminated from the bottom thereof through the transparent cup.

Light sources 31 and 32 surround the circular wall structure 34 which is high enough to prevent light from going directly from the light sources into the opening 35 in the bottom 36 of the light housing. A cavity is provided between the bottom 36 and the plate 37 for receiving the filter carriage 38 which is fixedly attached to the pivot pin 39 that extends through the plate 37 and is also fixedly attached to the crank 40 that is positioned under the plate 37. An actuating lever 41 is attached by pivot pin 42 to the crank 40. Lever 41 extends out of the cabinet housing this apparatus so that this lever and the crank 40 may be actuated from the outside of the cabinet when it is desired to shift either the green filter 43 or the red filter 44 into alignment between the holes 35 and 45 in the plates 36 and 37, respectively.

Magnets 46 and 47 are attached to the plate 37 as shown in FIG. 2, and these magnets are adapted to attract magnetic armatures 48 and 49, respectively, when one or the other of the filters is aligned with the viewing apertures 35 and 45. Thus, when the green filter 43 is in operating position magnet 46 attracts armature 48 and holds the filter carriage in this operating position, whereas when the red filter 44 is aligned with the apertures 35 and 45 in its operating position, magnet 47 attracts armature 48 and holds the carriage in this position.

Light sensitive cell or phototube 10 which is adapted to respond to the red and green light transmitted thereto is supported in housing 10a directly in line with the openings 35 and 45 so that light reflected from the product in cup 33 passes through these openings and the filter in registry therewith to the light sensitive cell.

The schematic wiring diagrams and embodiments of this invention shown in FIGS. 5, 6, 7 and 8 will now be described. The phototube 10 is connected to the amplifier 11 which is provided with a transistor 50 of the field effect type. Transistor 50 functions as a high impedance amplifier having unity gain and low impedance output. The anode of phototube 10 is connected to the positive 120 volt line 151 and the cathode is coupled to the gate of transistor 50 by the coupling capacitor 52. The cathode of phototube 10 is also connected to the upper terminal of the load resistor 53 and the lower terminal of this resistor is connected to the ground line 54.

Filter capacitor 55 is connected across the load resistor 53 to bypass undesired high frequency voltage fluctuations. Another filter capacitor 56 is connected between the drain electrode and the source electrode of transistor 50. Resistors 57 and 58 are connected in series between the drain electrode and the gate of transistor 50 and the common connection between these resistors is connected to the top terminal of resistor 59 which has a bottom terminal thereof connected to the ground line 54. Voltage dividing resistors 60 and 61 are connected in series between the 120 volt line 51 and the ground line 54, and the common connection between these resistors is connected to the drain electrode of transistor 50. The output of transistor 50 is provided across the resistor 62 and to the input of the coaxial cable 63.

Figure 6:
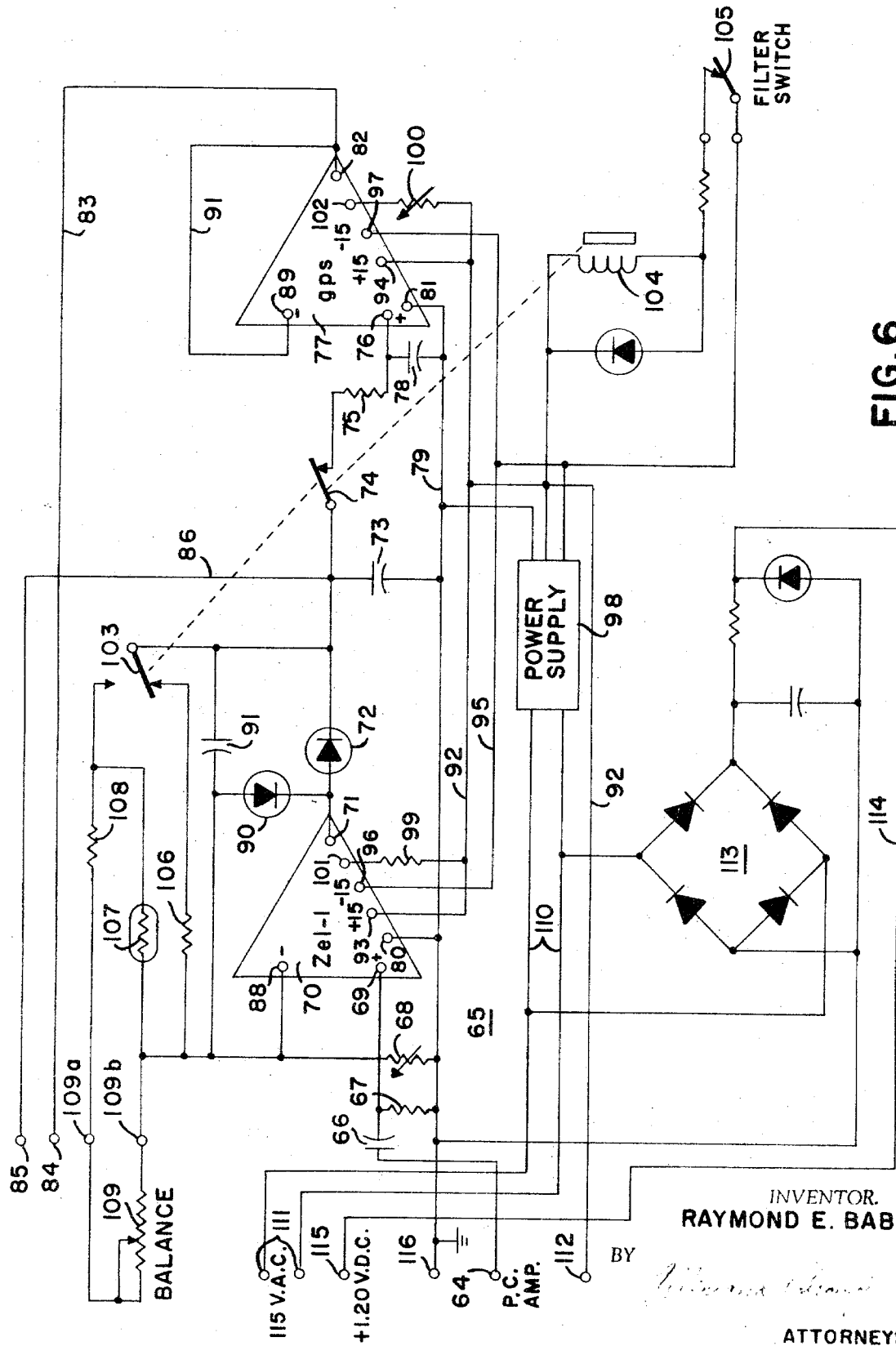
FIG. 6 is a schematic wiring diagram of the amplifier and memory circuits employed in the circuits shown in FIG. 5.

The shielded conductor of the coaxial cable 63 is connected to the terminal 64 of the amplifier and control apparatus 65. The schematic wiring diagram of the apparatus 65 is shown in FIG. 6 and in this figure the input terminal 64 is shown connected to one side of the capacitor 66. The other side of this capacitor is connected to the upper terminals of resistor 67 and to the terminal 69 of the operational amplifier 70. Gain control 68 is connected between terminals 80 and 88 of amplifier 70. Amplifier 70 is of conventional construction and may be of the type ZEL-1 manufactured by Zeltex Inc. of Concord, California. The output terminal 71 of amplifier 70 is rectified by diodes 72 and 90 and integrated by capacitor 73. The gain of amplifier 70 is controlled by resistor 106 when the amplifier is receiving the "green" signal, and by resistors 108 and 109 when it is receiving the "red" signal. Thermister 107 compensates for light intensity variation of sources 31 and 32 due to ambient temperature changes.

Output terminal 71 of the amplifier 70 is connected to the anode of diode 72 and the cathode of this diode is connected to the upper terminal of capacitor 73 and to the left hand side of switch 74. Capacitor 73 functions as a signal integrating device and its value is about ten microfarads. The contact of switch 74 is connected to one side of the resistor 75 and the other side of this resistor is connected to the terminal 76 of the operational amplifier 77. A capacitor 78 which functions as a storage memory for the green color signal is a low loss device capable of storing the "green" signal for up to ten minutes or more. Memory capacitor 78 is connected between the terminal 76 of the high input impedance amplifier 77 and the ground line 79. The ground line 79 is also connected to terminals 80 and 81 of amplifiers 70 and 77, respectively, and it is also connected to the bottom terminals of resistors 68 and 69 and capacitor 73.

Amplifier 77 is of the F0201 type manufactured by GPS Instrument Company, Inc. of Newton, Massachusetts and it is connected to accurately monitor the signal from capacitor 78 which is a highly internal impedance voltage source. The output terminal 82 of amplifier 77 is connected to the line 83 which leads to a terminal 84. Terminals 84 and 85 are connected to the meter circuit 87 shown in FIG. 5, and terminal 85 is also connected by line 86 to the output of amplifier 70. Both amplifiers 70 and 77 are provided with negative input terminals 88 and 89, respectively, and in the case of amplifier 70 terminal 88 is connected to the output terminal 71 through the diode rectifier 90. The cathode of diode 90 is connected to the output of terminal 71 of amplifier 70 and the anode of diode 90 is connected to the negative input terminal 88 of amplifier 70. Capacitor 91 is connected between the anode of diode 90 and the cathode of diode 72. A feedback loop is provided between the output terminal 82 and input terminal 89 of amplifier 77.

Terminals 93 and 94 are provided to amplifier 70 and 77, respectively, and these terminals are connected to the plus 15 volt line 92 which is supplied from the power supply 98. Additional terminals 96 and 97 are provided to amplifier 70 and 77, respectively, and these terminals are connected to the negative 15 volt line 95 which is connected to the power supply 98. Trimming potentiometers 99 and 100 are connected to terminals 101 and 102 of amplifier 70 and 77, respectively, and these potentiometers are connected between these terminals and the positive 15 volt line 92.

Switches 74 and 103 are mechanically controlled by the relay 104. These switches are connected as shown in FIG. 6 when the green signal, for example, is being supplied from the output of amplifier 70 to the memory amplifier 77 and capacitor 78. When the red signal, for example, is being supplied to amplifier 70, switch 105 which is mechanically coupled to the filter control lever 42 as shown in FIG. 4, is closed so that the winding of relay 104 is energized from power supply 98. This relay functions to open switch 74 and shift switch 103 to its upper contact.

When switch 103 is on its lower contact resistor 106 is in circuit between the negative input terminal 88 of amplifier 70 in the output line of this amplifier. Resistors 68 and 106 are selected as being of proper value for balancing the amplifier 70 for the green signal and resistors 107, 108 and 109 which are connected to the upper terminal of switch 103 are used together with variable resistor 68 to balance the amplifier circuit for the red signal as will be described in more detail in the description of the operation of this invention.

The power supply 98 is of a conventional construction provided with a transformer and rectifiers for developing the 15 volt supply from the conventional 115 volt alternating current provided thereto over lines 110 which are connected to terminals 111. The positive 15 volt line 92 which is connected to the supply 98 is also connected to the terminal 112 for use in the ratio circuit as will be described in connection with the description of FIGS. 7 and 8. This apparatus is also provided with a bridge rectifier 113, the input of which is connected to the 115 volt AC lines 110. Positive output of this rectifier is connected to line 114. The negative terminal of this rectifier is connected to the ground line 79 and terminal 116.

Figure 9:
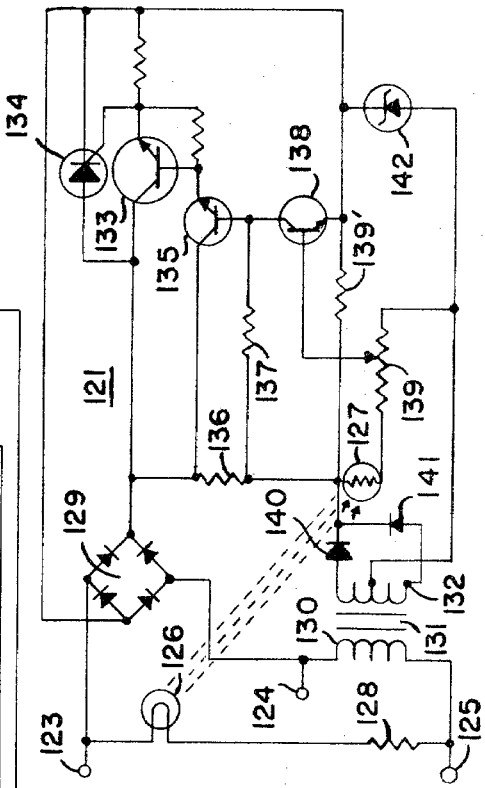
FIG. 9 is a schematic wiring diagram of the voltage regulator employed in the circuits shown in FIGS. 5 and 7.

The rectifier 113 shown in FIG. 6 is connected to the terminal 115 and the 120 volt DC supply provided by this rectifier is connected to the phototube 10 shown in FIG. 5, by the line 51. The 115 volt AC supply is provided to the amplifier apparatus 65 through the isolation transformer 120 and the voltage regulator 121 which is connected to a conventional 115 volt AC supply by the plug 122. The voltage regulator is provided with input and output terminals 123 and 124, respectively, and a terminal 125 which is common to the input and output thereof. The schematic diagram of connections of voltage regulator 121 is shown in FIG. 9, and this regulator 121 may be a model CVR-120 manufactured by the Wanlass Manufacturing Company, modified by adding the small incandescent type lamp 126 and the resistance type light sensitive cell 127 thereto to improve its voltage regulation characteristics. The lamp 126 is connected across the input of the regulator through the resistor 128 and it is coupled to the light sensitive cell 127 so that this cell is activated by the light produced by the lamp. The regulator is provided with a full wave rectifier 129 and the input of this rectifier is connected to the 115 volt supply through the winding 130 of the transformer 131. Transistor 133 and silicon control rectifier 134 are connected across the output of rectifier 129, and provide the load on this rectifier. Transistor 135 is connected to the output of bridge rectifier 129 and to the base of transistor 133 and controls the bias thereto. The bias potential to the base of transistor 135 is provided through resistors 136 and 137 and transistor 138 and the bias potential to the base of transistor 138 is provided from the potentiometer 139. Potentiometer 139 is connected in series with the light sensitive cell 127 across the output of the secondary winding 132 of transformer 131. The output voltage of the secondary 132 is rectified by rectifiers 140 and 141 and zener diode 142 is connected across this output through resistor 139' to stabilize the voltage thereof.

The resistor 128 has a value of about 4,000 ohms and reduces the current through the lamp 126 so that this lamp functions as a source of light in the red end of the spectrum that is transmitted to the light sensitive cell 127 which is positioned adjacent to the lamp 126. Fluctuations in the voltage applied to the input terminals 123 and 125 cause variations in the light impinging on the cell 127 so that this cell varies the bias potential of the base of transistor 138 which controls the bias potential applied to the base of transistor 135. Transistor 135 in turn controls the bias potential applied to the base of transistor 133 so that the load applied to the rectifier 129 by transistor 133 and silicon control rectifier 134 is varied in accordance with the fluctuations of the input voltage and the output voltage at the terminal 124 is maintained relatively constant.

Capacitor 143 is connected across the output of voltage regulator 121 as shown in FIG. 5 and this capacitor provides power factor correction. The high voltage transformer 145 is provided for energizing the light sources 11 and 12 which are gas-discharged tubes connected in series across the output terminals 146 and 147 thereof. The input of this transformer is provided with terminals 148 and 149 which are connected to the output terminals 124 and 125 of the voltage regulator, respectively.

Meter circuit 87, which includes the DC meter 150, is connected to terminals 84 and 85 of the control apparatus 65 in the circuit shown in FIG. 5. Terminal 84 is connected by line 83 to the output of amplifier 77 and terminal 85 is connected by a line 86 to the output of amplifier 70 as shown in FIG. 6. The meter circuit includes a capacitor 151 which is connected across the meter 150 and a resistor 152 which is connected in series with the meter. Diodes 153 and 154 are provided to the circuit for the purpose of protecting the meter from excessive voltage. A calibrating potentiometer 155 is connected in series with the meter and the purpose of this device will be described in the description of the operation of this invention.

Figure 7:
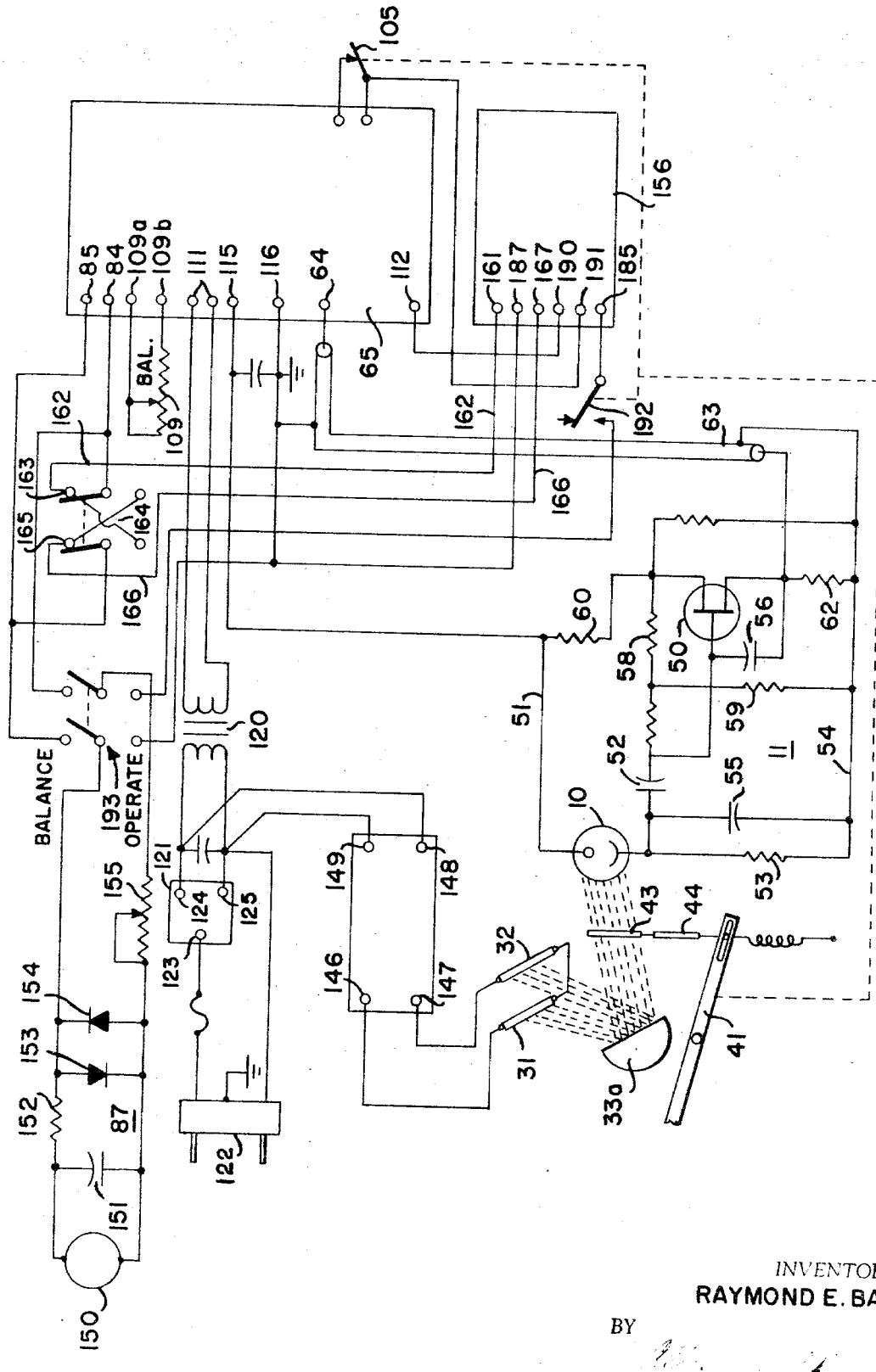
FIG. 7 is a schematic wiring diagram of the apparatus employed for obtaining the ratio between the signals from the two spectral modes.
Figure 8:
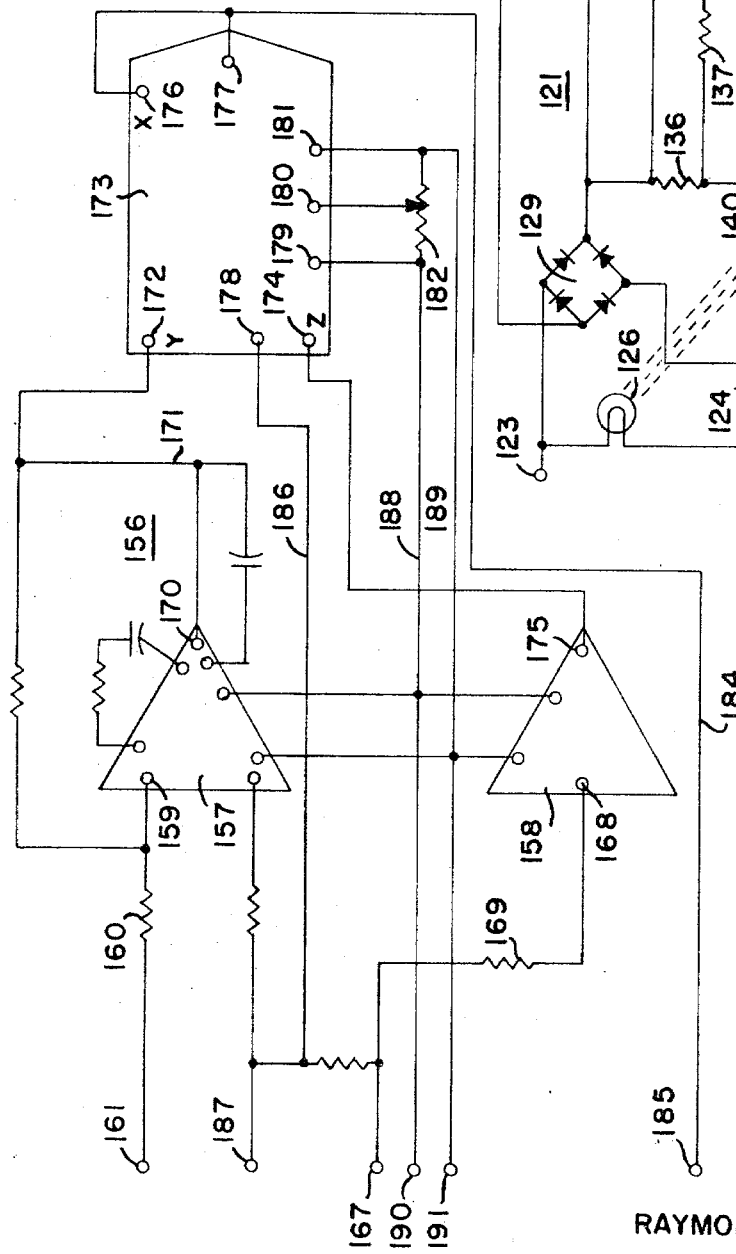
FIG. 8 is a schematic wiring diagram of the ratio computer employed in the circuit shown in FIG. 7.

The circuit shown in FIG. 7 is provided for obtaining the ratio between the red and green signals, for example, and for this purpose there is provided a ratio computer 156. Certain parts of the circuit shown in FIG. 7 are the same as those shown in FIG. 5, and therefor the common parts of these two circuits are indicated by the same reference numerals. The schematic wiring diagram of the ratio computer 156 is shown in FIG. 8 and it includes two operational amplifiers 157 and 158. Operational amplifier 157 is a unity gain inverting amplifier which inverts the positive signal supplied to its input terminal 159 and amplifier 158 is unity gain non-inverting. Amplifier terminal 159 is connected to the board input terminal 161 through resistor 160 and terminal 161 is connected by line 162 to terminal 163 of the reversing switch 164 as shown in FIG. 7. Terminal 165 of this switch is connected by line 166 to terminal 167 of the ratio computer, and to terminal 168 of the amplifier 158 through resistance 169. Amplifier 157 is an inverting amplifier having unity gain which changes the positive signal supplied to the input thereof to a negative signal supplied to the output terminal 170, and through line 171 to terminal 172 of the ratio computing device 173. The device 173 is a modular analogue multiplier which may be used for performing division and which is of the type manufactured by Intronics Inc. of Lewton, Massachusetts. This modular analogue multiplier is described on pages 10 to 20 of the April 1969 issue of Electronic Instrument Digest. Terminal 172 of the device 173 is referred to as the Y input and terminal 174 which is connected to the output terminal 175 of amplifier 158 is referred to as the Z input. The X terminal 176 is connected to the output terminal 177 and by line 184 to the terminal 185. Terminal 178 which is the common terminal is connected by line 186 to the ground terminal 187. Terminals 179, 180 and 181 are connected to the trimming potentiometer 182 and the terminals of this potentiometer are connected by lines 188 and 189 to terminals 190 and 191, respectively, which are connected to the 15 volt DC supply in the control apparatus 65, as previously described.

The connections to the meter circuit 87 employed in the embodiment of this invention shown in FIG. 7 differs from the connections shown in the embodiment illustrated in FIG. 5 in that a switch 193 is provided for connecting the meter circuit either to the terminals 84 and 85 of the control board 65 when the switch blades are in their upper amplifier balance position or to the terminals 187 and 185 of the ratio computer board 156 when the switch blades are in their lower operating position. A switch 192 is provided in the line leading to terminal 185 and this switch is mechanically coupled together with switch 105 to the filter control lever 41 for the purpose to be described hereinafter.

The operation of this invention will now be described, first with reference to the embodiment shown in FIG. 5. The green filter 43 is initially positioned between the product 33a and the light sensitive cell 10 since lever 41 is spring loaded to this position. Thus the green signal is initially supplied by light sensitive cell 10 and amplifier 11 over the coaxial cable 63 to the terminal 64 of the control board 65 which is connected to terminal 69 of the amplifier 70. This signal is rectified by diodes 72 and 90 which are connected to the output of amplifier 70 and the half wave rectified signal from these rectifiers is supplied to capacitor 73 which integrates or averages the half wave pulses to produce a relatively uniform DC level. Switch 74 is closed when the green signal is being developed so that this signal is supplied to the memory capacitor 78 which is charged from capacitor 73 to a value depending upon the magnitude of this green signal.

Because of the variance in transmission of the two color modes due to differences in light source intensities, filter transmission, etc., it is necessary that the gain of amplifier 70 shown in FIG. 6 be adjusted so that both the red and green signals produce the same magnitude output. This is accomplished by adjusting the potentiometer 109 when a neutral color disk is substituted for the product 33a. This disk produces equal spectral reflectance for both the red and green color lights. First the neutral disk is positioned to reflect light to the light sensitive cell 10 and the green filter is positioned in the light path. The light sensitive cell 10 develops the green signal which consists of a pulsating current and which is amplifed by amplifier 11. This signal is transmitted over the coaxial cable 63 to the terminal 64 of the control board 65 and to terminal 69 of amplifier 70 and rectified by the diodes 72 and 90 which are connected to the output of this amplifier as previously mentioned. The rectified green signal is supplied through switch 74, which is closed when the green filter is in operating position, to capacitor 78 and is stored in this capacitor. The red filter is then moved into its operating position switch 105 is closed and relay 104 is energized so that switch 74 is open and switch 103 is shifted to its upper contact. The red signal is then supplied to the meter circuit over line 86 while the green signal is supplied from the memory amplifier 77 to the other side of the meter circuit over line 83. By using meter 150 as a null indicator the gain of amplifier 70 is adjusted by varying potentiometer 109 so that the red signal output is equal to the green signal output.

After the amplifier is balanced as described, the meter circuit 87 is calibrated to establish the meter scale factor by varying the potentiometer 155. This is done while the neutral disk is being viewed by cell 10 as described and meter 150 is adjusted to read 100, that is full scale, by adjusting the calibrate potentiometer 155. Thus with the neutral disk being viewed, meter 150 should read 100 for both the green and red signals after the amplifier is balanced.

It is obvious that the meter scale factor may be adjusted to give other than full scale readings with the neutral disk if desired. Furthermore, the amplifier 70 may be adjusted or balanced so that it gives different predetermined outputs for the red and green signals if desired and signals obtained from colors other than red and green may be used. Balancing of the main amplifier may also be performed by using a white disk in place of the neutral disk and the main amplifier gain adjusted for a certain meter reading characteristic of a condition of the product being graded.

After this device is adjusted as described it is in condition to use for color grading various products such as tomatoes, peaches, cereals, coffee and the like, by indicating or measuring the values of the two colors reflected from the products.

This device may also be used for obtaining the ratio between two color signals and for such use this device is provided with the circuit shown in FIG. 7 which employs the ratio computer 156 shown in detail in FIG. 8. The main amplifier 70 used in this circuit is balanced as previously described and the scale factor of meter 150 is also adjusted for the particlar product. Switch 193 is set in its lower position. Reversing switch 164 is set in its upper position when the green signal obtained from the product is greater than the red signal. If the red signal is greater than the green signal switch 164 is set in its lower position. Otherwise, the meter 150 will be deflected off scale assuming the meter factor is initially set by potentiometer 155 at full scale as previously described.

The product to be graded is placed in the instrument cup 33 and illuminated by the green light since the green filter is initially in the light path. The green signal is stored in the capacitor 78 which is connected to the memory amplifier 77. Lever 41 is then operated to shift the red filter into the light path. Lever 41 also closes switches 105 and 192 which are mechanically coupled thereto. Switch 74 is opened and switch 103 is shifted to its upper contact from its lower contact. Thus, the memory is isolated from amplifier 70 at switch 74 and the green signal is held in storage. Also, the red signal balancing circuit is connected to amplifier 70 by switch 103. Switch 164 is used to transmit the red and green signals from the main amplifier and memory amplifier of board 65 to the amplifiers of the ratio board 156 which are connected to the Y and Z terminals of the division circuit 173. The meter circuit 87 is connected by switch 193 to terminals 185 and 187 of the ratio board 156 so that meter 150 indicates the ratio of the red and green signals.

While I have shown and described a preferred embodient of the invention, it is apparent that the invention is capable of variation and modification from the form shown so that the scope thereof should be limited only by the scope of the claims appended hereto.

What I claim is:

1. The method of color grading products by making reflectance measurements of selected ones of said products in separate parts of the light spectrum for use in determining a condition of the products comprising the steps of illuminating a sample product with light of two different hues in well spaced parts of the spectrum, reflecting the light of said two hues from a surface of said product, selecting one of said reflected hues and generating an electric signal therefrom corresponding to the intensity of the reflected hue, amplifying said signal, integrating said amplified signal, storing said integrated signal in a memory for a substantial time duration, supplying the signal from the memory to a high impedance amplifier, disconnecting the integrating device from the memory, selecting the other of said reflectance hues and generating another electric signal therefrom corresponding to the intensity of said other selected hue, amplifying and integrating said other signal, comparing the magnitude of said other integrated signal with the magnitude of said stored signal by supplying these signals simultaneously to an indicating device thereby showing a comparison of the reflectance of the product at said two hues.

2. In apparatus for color grading products by measuring the light reflectance thereof at different parts of the light spectrum for use in determining a condition of a product, the combination comprising means illuminating a sample of the product with light of two different hues in well spaced parts of the spectrum, light sensitive cell means, a pair of filters selectively transmitting light of said two different hues reflected from the product, manually operable means normally positioning one of said filters between said product and said light sensitive cell means so that light reflected from said product corresponding to one of said hues is transmitted to said light sensitive cell means, amplifying means connected to said light sensitive cell means amplifying the signal received from said cell means corresponding to said one hue, integrating means connected to the output of said amplifying means for integrating said signal, an electronic memory, switch means connecting said memory to said integrating means, a high impedance amplifier connected to said memory, said memory storing said signal of said one hue, said manually operable means moving said one filter out of the light path between said product and said cell means and moving said other filter into said path, said manually operable means simultaneously controlling means disconnecting said memory from said integrating means, said cell means supplying a second electric signal to said amplifying means corresponding to said other hue, said other electric signal being integrated by said integrating means, indicating means and means supplying said integrated other electric signal to said indicating means simultaneously with the stored signal from the output of said high impedance amplifier whereby the comparison of said signals is indicated by said indicating means to provide an indication of a condition of the product.

3. The method of color grading products by making reflectance measurements of a product in separate parts of the light spectrum for use in determining a condition of the product comprising the steps of illuminating the product the reflectance of which is being measured with light of two different hues in well spaced parts of the spectrum, reflecting the light of said two hues from a surface of the product being measured, selecting one of said reflected hues and generating an electric signal therefrom corresponding to the intensity of said selected hue, amplifying said signal, rectifying and integrating said signal, storing said integrated signal in a memory, isolating said memory with the stored signal therein, selecting the other of said reflected hues and generating another electric signal therefrom corresponding to the intensity of said other selected hue, amplifying, rectifying and integrating said other electric signal, comparing the magnitude of said other integrated signal with the magnitude of the signal stored in said memory by supplying said signals simultaneously to an indicating device thereby providing a comparison of the reflectance of said product at said two hues.

4. The method of color grading products by making reflectance measurements of a product in separate parts of the light spectrum for use in determining a condition of the product comprising the steps of illuminating the product the reflectance of which is being measured with light of two different hues in well spaced parts of the spectrum, reflecting the light of said two hues from a surface of the product being measured, selecting one of said reflected hues and generating an electric signal therefrom corresponding to the intensity of said selected hue, amplifying said signal in an amplifier, storing said amplified signal in a memory, manually selecting the other of said reflected hues and isolating said memory from said amplifier and simultaneously connecting said amplifier to an indicating device, generating another electric signal corresponding to the intensity of said other selected hue and simultaneously supplying said other electric signal to said indicating device with the signal stored in said memory thereby comparing the magnitude of said other signal with that of the signal stored in said memory for indicating a comparison of the reflectance of said product at said two hues.

5. In apparatus for measuring light reflectance of a product at different parts of the light spectrum for use in determining a condition of the product, the combination comprising means illuminating a product, light sensitive cell means, a pair of filters selectively transmitting light of two different hues reflected from the product, manually operable means selectively moving one of said filters into the light path between said product and said light sensitive cell means, said hues of light being in well spaced parts of the light spectrum, said light sensitive cell means producing a first electric signal corresponding to the hue transmitted by said one filter positioned in said light path, an electronic memory, amplifying means, means connecting said amplifying means to said cell means, an electrical indicating device, means connecting said memory said indicating device, switch means connecting said amplifying means to said memory supplying said first electric signal to said memory for storing said signal therein, said manually operable means selectively moving the other of said filters into said light path so that said light sensitive cell means produces a second electric signal corresponding to the hue transmitted by said other filter, said switch means supplying said second signal to said indicating device and simultaneously disconnecting said amplifying means from said memory, said indicating device being responsive to said first and said second signals simultaneously whereby said indicating device produces an indication showing a comparison of the reflectance of said product at said two hues.

6. Apparatus for color grading products by measuring the light reflectance thereof at different parts of the light spectrum for use in determining a condition of the product the combination as set forth in claim 5 further comprising means coupling said switch means to said manually operable means for simultaneous control thereof.

7. Apparatus for color grading products by measuring the light reflectance thereof at different parts of the light spectrum for use in determining a condition of the product the combination as set forth in claim 5 further comprising integrating means connected to said amplifying means, said integratng means dissipating the part of a previously memorized signal in said memory that exceeds a current signal to be memorized by said memory.

* * * * *